Oct. 9, 1945.　　　　W. B. PUMPHREY　　　　2,386,506
FILTER
Filed Jan. 24, 1944
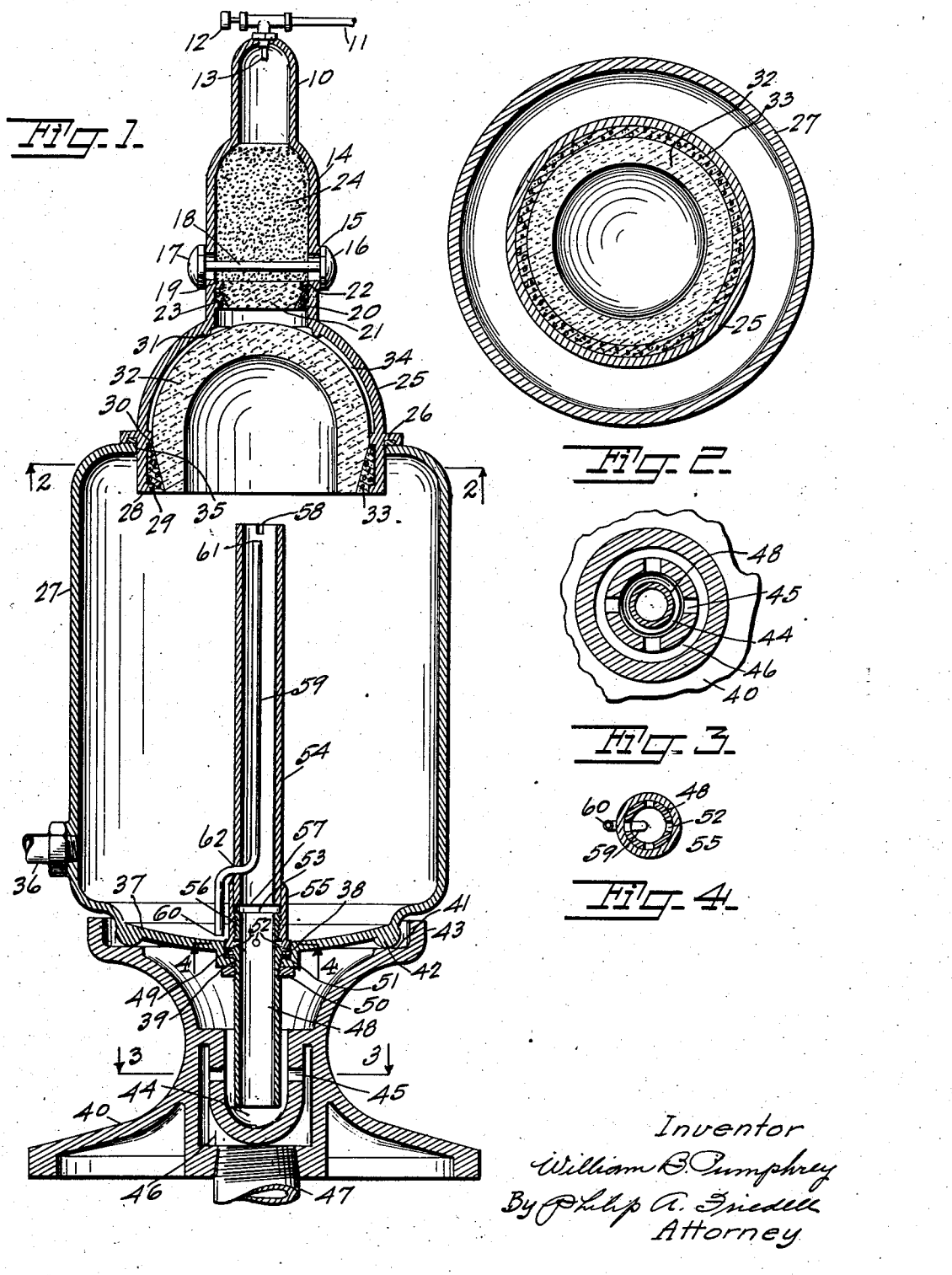
Inventor
William B. Pumphrey
By Philip A. Friedell
Attorney Patented Oct. 9, 1945

2,386,506

UNITED STATES PATENT OFFICE 2,386,506

FILTER

William B. Pumphrey, Oakland, Calif.

Application January 24, 1944, Serial No. 519,557

11 Claims. (Cl. 210—104)

This invention, a filter, is an improvement over conventional types of filters in that it employs a series of filter stages each of a different filtering medium and different degree of perviousness; in that only one of the several filter stages ever requires cleaning or renewal and that at very infrequent intervals, with cleaning or renewal easily and quickly accomplished; in that filtering is carried out under pressure without exerting any pressure on the filtrate container; that the amount of filtrate is easily adjusted to suit the normal demand; that any normal excess is drained from the bottom of the container; and that there is no possibility of contamination of the filtrate from extraneous sources.

The objects and advantages of the invention are as follows:

First, to provide a filter of simple construction and of a compact size, and which will filter liquids with the highest degree of efficiency.

Second, to provide a filter which is operated under pressure and which is regulatable to suit the demand, and which under regulated conditions will discharge any normal excess of filtrate during periods of subnormal demand, to waste solely from the lower portion of the filtrate container.

Third, to provide a filter in which several different filtering mediums are employed in series, with only the first stage requiring cleaning or renewal, and to provide for rapid and convenient cleaning or renewal thereof.

Fourth, to provide a filter in which a series of three filter mediums are employed, with the first consisting of a granular loose material, and the others two different types of pervious molded materials of respectively lesser degrees of perviousness and increased filtering areas, sealed in their respective positions.

Fifth, to provide a filter in which the final filtering medium consists of a dome-shaped form of slightly pervious material, with the inside of the dome forming the discharge side.

Sixth, to provide a filtrate container with a central riser pipe for discharge of any great excess of filtrate, and to provide a tubular discharge member extending from the lowest portion of the container externally of the riser to a point adjacent the top inside of the riser so as to normally discharge excess filtrate from the bottom of the container.

Seventh, to provide the riser with a fluid trap to permit discharge of excess filtrate to waste while simultaneously preventing any contamination by air or gases of the filtrate by air or gases from exterior sources.

Eighth, to form the riser pipe in two sections threadedly connected and with passages through the walls of the lower section close to the bottom of the container and with the lower end of the upper section normally sealing the passages, with the passages openable for complete drainage of the container through part unscrewing of the upper section from the lower section.

Other objects and advantages of the invention will become apparent as the following description is read on the drawing forming a part of this specification, in which:

Fig. 1 is a sectional elevation through the invention.

Fig. 2 is a section taken on line 2—2 of Fig. 1.

Fig. 3 is a section taken on line 3—3 of Fig. 1.

Fig. 4 is a section taken on line 4—4 of Fig. 1.

The filter consists of three quickly and easily replaceable units, respectively, the filter unit, the container, and the support.

The filter unit consists of a triple dome shell with the upper dome 10 forming the distribution chamber for the fluid to be filtered, and has a supply pipe 11 adjustable through a stop cock 12 secured in the upper end of the dome and terminating in a nozzle 13.

This upper dome 10 continues into the enlarged median dome 14 which is filled with a suitable granular filtering material, such as fine granulated quartz or pure silica sand to form the first filtering stage, and has a through passage 15 diametrically through the lower end through which the filtering material can be washed or renewed, the opposite passages being indicated as sealed by cap nuts 16 and 17 and the stud 18.

Annular collars 19 and 20 are formed interiorly near the lower end of the median dome, and a disc of pervious filtering material 21 forming the second filtering stage, has a shoulder 22 which is seated against the bottom of the upper collar 19 and sealed in place by a special cement 23 which in turn is locked in place by the lower collar 20. This disc may be made of any suitable filtering material, preferably of a molded and fused material, one such material being a fine mesh Alundum. The cement used is one which contains no soluble elements and which will form a perfect seal to direct all liquid through the disc. The inverted frusto-conical form of the filter disc is particularly suitable for this method of sealing and anchoring. It will be noted that the granular filtering material 24 is supported by this disc, therefore the disc simultaneously functions as a filtering medium and as a support for the granular filtering material. The actual form of this dome is a cylinder with spherical upper end.

This median dome continues into the lower dome 25 which has an exterior annular collar 26 to seat on the top of the container 27, and is located in spaced relation above the bottom 28 of the lower dome. Two annular collars 29 and 30 are formed interiorly of the dome, one being at the bottom and the other in spaced relation above. Projections or beads 31 are formed in the upper portion of the dome adjacent to its opening into the median dome.

The third filtering stage is formed by a dome-shaped filtering element 32 made of a special filter composition cast to form and which seats against the beads 31 and slidably fits within the annular collar 30 and is sealed in place by cement 33 which itself is locked in place by the internal annular collar 29. This leaves a free space 34 for fluid between the inside walls of the dome shaped casing 25 and the exterior of the filter member, providing an exceptionally great filtering area.

The container 27 has an opening 35 to receive the lower end of the filter unit, and a suitable spigot 36 is provided in accordance with requirements. The bottom 37 of the container is formed to drain to the center at which point a recess 38 is formed with a central aperture 39.

A suitable base 40 has a plane surface 41 on which the beads 42 formed on the bottom of the container rest, and this portion has an annular collar 43 to form a catch basin for condensation which may drain down the exterior of the container. A sump 44 is formed in the base 40 and this sump has passages 45 leading into the discharge chamber 46 which has a connection 47 to waste, and which connection preferably consists of a trap. Obviously, the base 40 may be provided with a wall bracket, not shown, or with any other desired means of support.

A combined drain pipe and trap member 48 has an annular collar 49 intermediate its height and is threaded both, below and above this collar; and passes through the central passage in the container with a suitable gasket interposed between the collar 49 and the seat at the bottom of the recess. This pipe extends down into the sump 44 to a point below the passages 45, thus forming a trap. Holes 52 are formed diametrically through the pipe 48 just above the collar 49, and the pipe terminates a short distance above these passages as indicated at 53. A riser or overflow pipe 54 has a sleeve 55 fixed at the lower end and internally threaded to fit the upper threaded portion 56 of the drain pipe; the main portion of the overflow pipe terminating in spaced relation to the top of the drain pipe as indicated at 57, and extends upwardly nearly to the top of the container, and has suitable means, such as plate or screw driver slots 58 provided at the upper end for screwing the member down to a seal with the collar 38 to seal the passages 52, and for unscrewing the member to uncover these passages 52 to completely drain the container.

A withdrawal tube 59 extends from the bottom of the container exteriorly of the riser as indicated at 60, to a point 61 close to the top and inside of the riser, and is indicated as passing through the wall of the riser at 62 at which point it is sealed in the wall.

In assembling the filter unit, the opening for the stop cock at the top is plugged, and the side passages are closed by the cap nuts and stud. The shell is inverted and filled with the granular filter material about to the height of the stud. The median filter element is then placed in position and sealed in place by filling the peripheral recess with a suitable cement. The last stage filter element is then placed in position and the peripheral recess is filled with the same kind of cement.

The drain pipe is secured in place in the bottom of the container, and the overflow or riser pipe is screwed down on the upper end of the drain pipe to seat, and the filter unit is placed in the top of the container.

In the drawing, the container is disproportionately reduced in size, and the upper portion of the filter unit is disproportionately reduced in height.

A source of water under pressure is supplied through the pipe 11 and its flow regulated by the stop cock 12 to supply the normal amount of filtered water required. This water is subject to very little resistance through the first filter stage (the loose granular mass), which retains all suspended matter. The resistance through the second stage is moderate, the element being of sufficiently fine mesh or low permeability to retain even the finest suspensions. High resistance to flow per unit area is offered by the third stage which is of extremely fine mesh or extremely low permeability, for which reason its filtering area is very great in comparison to that of the second stage. It will be noted that the entire superficial area exteriorly is accessible to the water which has passed through the second stage, and that interiorly, the flat bottom end of the filter element functions along with the cylindrical and spherical areas.

When the container becomes filled to the top of the withdrawal tube 59, water passes from the bottom of the container up through this tube and out through the top into the riser, thence down through the riser into the trap 44, forming a seal against extraneous air or gases, the water passing from the trap to waste through the pipe 47. If the flow should become unduly excessive, the excess will overflow into the riser, however, the preferred withdrawal is from the bottom of the container. If the container is to be drained, the filter unit is removed from the top of the container and the riser is unscrewed to uncover the passages 52, through which the container will be completely drained.

The second and last stage filter elements appear to never require cleaning or replacement. The first stage is easily cleaned by inverting the unit, removing the cap nuts and the stud, and passing a strong current of water upwardly from the stop cock, then replacing the stud and cap nuts, when it is again ready for use.

This first stage is also easily replaced by merely removing the cap nuts and stud and washing the material out through the passages by a stream of water from the stop cock, thereafter inverting the unit and refilling with filter material through these passages, then replacing the stud and cap nuts.

I claim:

1. A filter, in combination, a container having an overflow passage and a trap therefor; a three-stage filter unit of relatively decreasing permeability and supported by and discharging into said container, and an inlet for liquid under pressure and connected to the initial one of said three stages, and flow control means for said inlet; said overflow passage comprising; a pipe fixed in the bottom of said container and having an upward extension provided with diametric passages opening into the lower portion of said container, and a downward extension terminating in a sump to form said trap; and a second pipe having its lower end telescopically associated with said upward extension and adjustable to open and close said passages for draining the container or for sealing the passages at will; a tube extending from the lower portion of said container exteriorly of said second pipe to a point near the top and within said second pipe, for draining excess filtrate from the lower portion of the body of filtrate in the container.

2. A filter, in combination, a container having an overflow passage and a trap therefor; a three-stage filter unit of relatively decreasing permeability and supported by and discharging into said container, and an inlet for liquid under pressure and connected to the initial one of said three stages, and flow control means for said inlet; said filter unit comprising; a cylindrical casing terminating at its lower end in a dome shaped portion of greater diameter; said flow control means being connected at the upper end of said cylindrical casing; a partition mounted in said cylindrical casing above the level of communication with said dome shaped portion and consisting of a molded section of filter material of medium permeability; a granular filter material in said cylindrical casing above and supported on said partition; a dome shaped filter element formed of filter material of low permeability and mounted in said dome shaped portion and sealed thereto at the lower end with the exterior periphery above the seal clearing the walls of said dome shaped portion for access of liquid, with the discharge side formed by the lower surface and interior of the dome; said dome shaped filter element having an area greater than that of said partition in conformity with the difference in permeabilities.

3. A filter comprising; a container having an outlet at the bottom thereof and a trap for said outlet, and a riser in communication with said outlet for passing great excesses of filtrate to said trap by overflow, and a tube extending from the bottom of said container exteriorly of said riser to a point adjacent the top within said riser to pass normal excesses of liquid from the lower portion of the body of filtrate within the container to said trap; a filter unit mounted in the top of said container, and an outlet for liquid under pressure for said filter unit.

4. A structure as defined in claim 3; said filter unit comprising; a casing including a vertical cylindrical section closed at the upper end and terminating at the lower end in a dome-shaped shell open at the bottom; a partition sealed within said cylindrical section immediately above said dome-shaped shell and formed of filter material of medium permeability; a supply of loose granular filter material within said cylindrical section and supported by said partition; and a dome-shaped form of filter material of low permeability located within said dome-shaped shell and clearing the walls thereof and sealed at the lower end to said walls and having an area greater than said partition proportionate to the differences in permeability.

5. A structure as defined in claim 3; said filter unit comprising a casing including a vertical cylindrical section closed at the upper end and terminating at the lower end in a dome-shaped shell open at the bottom, and a pressure fluid connection for said upper end; a partition sealed within said cylindrical section immediately above said dome-shaped shell and formed of filter material of medium permeability; a supply of loose granular filter material within said cylindrical section and supported by said partition; a dome-shaped form of filter material of low permeability located within said dome-shaped shell and clearing the walls thereof and sealed at the lower end to said walls and having an area greater than said partition proportionate to the differences in permeability; and passages formed through the opposite walls of said cylindrical section immediately above said partition for removal, replacement, or cleaning of said granular material, and means manually releasable for sealing said passages.

6. A filter unit comprising; a lower dome-shaped shell open at the bottom; a median cylindrical shell opening into the top of said dome-shaped shell and extending upwardly; an upper cylindrical shell opening into the top of said median shell and extending upwardly and sealed at the upper end and having a connection for a source of liquid under pressure; a molded section of filter material peripherally sealed within said median shell in slightly spaced relation above the upper end of said dome-shaped shell and forming a partition, with the median shell filled with loose granular filter material and supported on said partition; and a dome-shaped form of molded filter material located within said lower shell and peripherally sealed at the lower end to said shell with the exterior surface clearing the interior surface of the shell for accessibility of liquid.

7. A structure as defined in claim 6; diametric passages formed through the opposite walls of said median cylindrical shell directly above said partition, for removal, replacement, or cleaning of said granular filter material, and releasable sealing means for said passages.

8. A structure as defined in claim 6; an annular flange formed exteriorly of said dome-shaped shell in spaced relation above the lower end and forming a support for the unit on a container for the filtrate.

9. A structure as defined in claim 6; diametric passages formed through the opposite walls of said median cylindrical shell directly above said partition, for removal, replacement, or cleaning of said granular filter material, and releasable sealing means for said passages; an annular flange formed exteriorly of said dome-shaped shell in spaced relation above the lower end and forming a support for the unit on a container for filtrate.

10. A structure as defined in claim 6; vertically spaced annular rings formed interiorly of said median cylindrical shell immediately above the lower end thereof with the upper peripheral edge of said partition resting against the under surface of the upper ring, and with the space between the rings and between the peripheral surface of the partition and the shell filled with cement whereby the partition is peripherally sealed.

11. A structure as defined in claim 6; two annular rings formed interiorly of said dome-shaped shell with one ring located at the bottom of the shell and the other in spaced relation above, beads formed inwardly at the upper end of said dome shaped shell adjacent to the opening into the median cylindrical shell; said dome-shaped form being exteriorly beveled at its lower end, with the space between the bevel and shell and between the annular rings filled with cement to form the seal for the form with the lower ring locking the cement against displacement; said form being spaced from the shell by the upper of said rings and by said beads to provide space for liquid about the entire superficial exterior area of the form.

WILLIAM B. PUMPHREY.